J. F. DARBY.
Vehicle-Wheel.
No. 228,805.  Patented June 15, 1880.
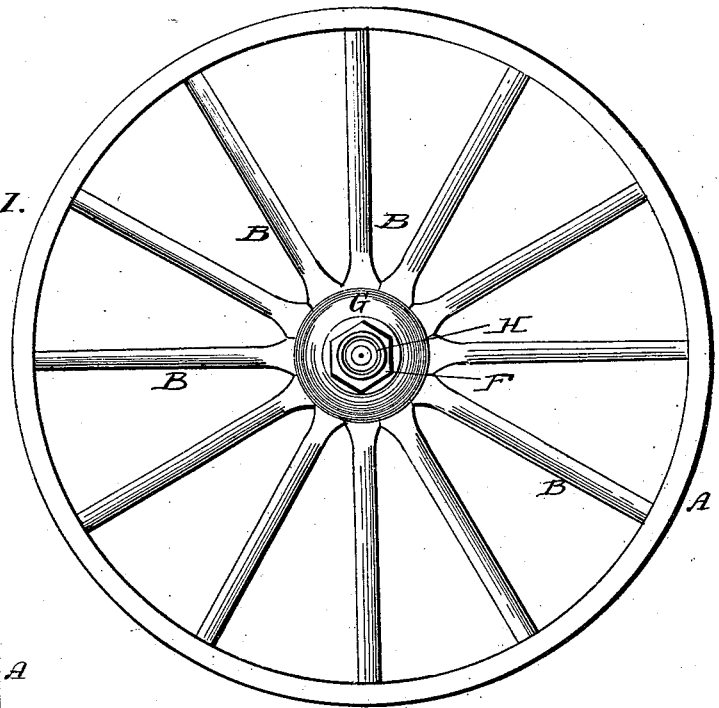
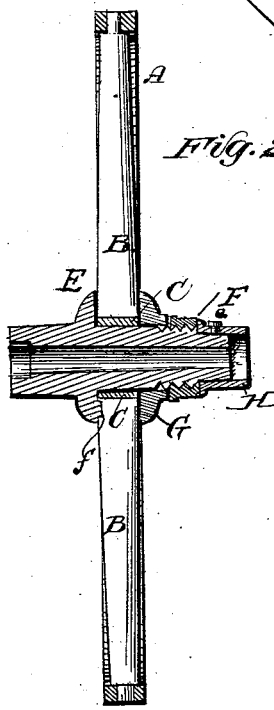
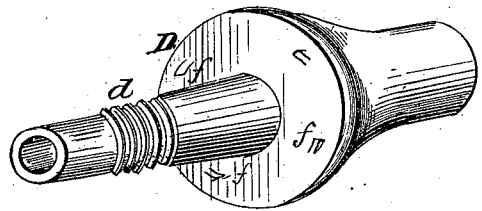
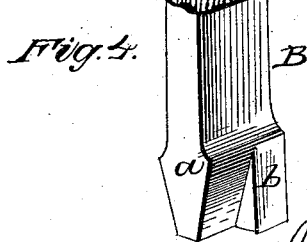
Witnesses
Fred. G. Dieterich
Albert M. Krause
Inventor
John F. Darby
by Louis Bagger & Co.
Attorneys
N. PETERS, PHOTO-LITHOGRAPHER, WASHINGTON, D. C.

UNITED STATES PATENT OFFICE.

JOHN F. DARBY, OF MONROE, GEORGIA.

VEHICLE-WHEEL.

SPECIFICATION forming part of Letters Patent No. 228,805, dated June 15, 1880.

Application filed February 14, 1880.

*To all whom it may concern:*

Be it known that I, JOHN F. DARBY, of Monroe, in the county of Walton and State of Georgia, have invented certain new and useful Improvements in Wheels for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a front or face view of a wheel embodying my improvement, the hub and hub-plates having been removed. Fig. 2 is an axial section of the complete wheel. Fig. 3 is a perspective view of the hub with its stationary flange or plate, and Fig. 4 is a perspective view of one of the spokes detached.

Similar letters of reference indicate corresponding parts in all the figures.

This invention has relation to wheels for vehicles of all kinds; and it consists in the improvements hereinafter fully described, and particularly pointed out in the claim.

In the drawings, A is the rim of the wheel, the spokes B of which impinge with their inner ends upon a short cylinder or ring, C, made of malleable iron, cast-iron, or other suitable metal. This ring is perfectly plain and smooth, and has no recesses to receive the ends of the spokes, which are therefore not inserted into, but merely impinge upon, its cylindrical outside face.

The inner impinging end of each of the spokes B is formed with a wedge-shaped shoulder, *a*, on one side, which is formed by cutting a triangular piece out of each side, reaching half-way into the depth of the spoke, as shown more clearly in Fig. 4. In placing the spokes around the central ring or cylinder, C, each alternate spoke is reversed, so that the projecting flanges *b* on each side of the wedge-shaped shoulder *a* will interlock with the flanges of the spokes next to it on each side, the spoke last driven into place, or the "key-spoke," binding the whole firmly together around the central ring, C, as shown in Fig. 1 of the drawings.

The metallic hub D is cast with a flange, E, and is threaded near its outer end, as shown at *d*. The cylindrical part or body D is inserted into the central ring or cylinder, C, of the wheel, which is held in place by the jam-nut F and detachable annular flange-plate G.

To prevent the nut from working loose a sleeve or thimble, H, is inserted upon the outer end of the hub D *d*, and held in place detachably by screws *e e*.

To prevent any possibility of the wheel, with its central ring, C, turning upon its cylindrical hub D, its stationary flange-plate E is serrated or roughened upon its inner face; or it may be provided with a series of circumferentially disposed projecting spurs, *f f*, which are forced into the wood of the spokes, thus serving the double purpose of wedging these closer together and effectually preventing turning of the wheel upon its hub D.

This wheel is exceedingly strong and durable, and by simply removing the sleeve H, nut F, and collar G any one of the spokes may readily be removed and another inserted, if required from breakage or other causes.

Having thus described my invention, I claim and desire to secure by Letters Patent of the United States—

In a wheel for vehicles, the combination of the rim A, spokes B, having wedge-shaped shoulders *a* and laterally-projecting flanges *b b*, central smooth ring or cylinder, C, cylindrical hub D, having annular flange-plate E and screw-thread *d*, detachable collar G, jam-nut F, and sleeve H, provided with the fastening-screws *e e*, the whole constructed and combined substantially in the manner and for the purpose herein shown and specified.

In testimony that I claim the foregoing as my own I have hereto affixed my signature in presence of two witnesses.

JOHN F. DARBY.

Witnesses:
THOMAS C. CAMP,
CALVIN G. NOWELL.